United States Patent
Wang et al.

(10) Patent No.: US 12,373,607 B2
(45) Date of Patent: Jul. 29, 2025

(54) USING SECURE MULTI-PARTY COMPUTATION TO IMPROVE CONTENT SELECTION PROCESS INTEGRITY

(71) Applicant: Google LLC, Mountain View, CA (US)

(72) Inventors: Gang Wang, Frederick, MD (US); Marcel M. Moti Yung, New York, NY (US); Kevin Wei Li Yeo, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/635,669

(22) Filed: Apr. 15, 2024

(65) Prior Publication Data

US 2024/0265150 A1     Aug. 8, 2024

Related U.S. Application Data

(63) Continuation of application No. 17/795,024, filed as application No. PCT/US2021/054340 on Oct. 11, 2021, now Pat. No. 12,026,287.

(30) Foreign Application Priority Data

Dec. 13, 2020   (IL) .......................................... 279405

(51) Int. Cl.
   *G06F 21/64*    (2013.01)
   *G06F 21/62*    (2013.01)
   (Continued)

(52) U.S. Cl.
   CPC .......... *G06F 21/64* (2013.01); *G06F 21/6254* (2013.01); *H04L 9/085* (2013.01); *H04L 63/20* (2013.01); *H04L 2209/46* (2013.01)

(58) Field of Classification Search
   None
   See application file for complete search history.

(56) References Cited

U.S. PATENT DOCUMENTS

2012/0233460 A1   9/2012   Kamara et al.
2017/0228547 A1*  8/2017   Smith ................. H04L 63/0428
(Continued)

FOREIGN PATENT DOCUMENTS

CN      111092880       5/2020
JP      2010-244572    10/2010
(Continued)

OTHER PUBLICATIONS

Extended European Search Report in European Appln. No. 23202856.3, mailed on Jan. 31, 2024, 7 pages.
(Continued)

*Primary Examiner* — Anh Nguyen
(74) *Attorney, Agent, or Firm* — Fish & Richardson P.C.

(57) ABSTRACT

This document describes systems and techniques for improving the integrity and protecting the security of information in content selection and distribution. In one aspect, a method includes receiving, by a first server of a secure multi-party computation (MPC) system from an application on a user device, a request for a digital component. The request is parsed into distinct sub-requests. Each sub-request is transmitted to a different server. A set of candidate selection values is received from a separate server. The first server performs, in collaboration with one or more second servers of the MPC system, a selection process to generate a selection result for a winning digital component, including merging, the first set of candidate selection values and a set of cached selection values to create a final set of candidate selection values and sorting the final set according to the values of the candidate selection values.

20 Claims, 5 Drawing Sheets

(51) Int. Cl.
  *H04L 9/08*   (2006.01)
  *H04L 9/40*   (2022.01)

(56) References Cited

U.S. PATENT DOCUMENTS

| | | | |
|---|---|---|---|
| 2020/0021568 | A1 | 1/2020 | Becher et al. |
| 2020/0242466 | A1 | 7/2020 | Mohassel et al. |
| 2020/0267144 | A1 | 8/2020 | Wagner et al. |
| 2020/0286145 | A1* | 9/2020 | Storm .................. H04L 9/0625 |
| 2020/0336313 | A1 | 10/2020 | Knox |
| 2022/0377084 | A1 | 11/2022 | Zhang et al. |
| 2022/0414247 | A1* | 12/2022 | Wang ................. G06F 21/6218 |

FOREIGN PATENT DOCUMENTS

| | | |
|---|---|---|
| JP | 2015-194959 | 11/2015 |
| JP | 2019-501437 | 1/2019 |
| WO | WO 2016148281 | 9/2016 |
| WO | WO 2019143360 | 7/2019 |
| WO | WO 2019211111 | 11/2019 |

OTHER PUBLICATIONS

International Preliminary Report on Patentability in International Appln. No. PCT/US2021/054340, mailed on Jun. 22, 2023, 8 pages.
International Search Report and Written Opinion in International Appln. No. PCT/US2021/054340, mailed on May 16, 2022, 13 pages.
Notice of Allowance in European Appln. No. 21865330.1, mailed on Jul. 19, 2023, 9 pages.
Notice of Allowance in Israel Appln. No. 279405, mailed on May 7, 2023, 3 pages.
Notice of Allowance in Japanese Appln. No. 2022-541856, mailed on Jan. 30, 2023, 5 pages (with English translation).
Notice of Allowance in Japanese Appln. No. 2023-030973, mailed on Jul. 29, 2024, 5 pages (with English translation).
Office Action in Indian Appln. No. 202227033809, mailed on Dec. 5, 2023, 6 pages (with English translation).
Office Action in Japanese Appln. No. 2023-030973, mailed on Apr. 22, 2024, 6 pages (with English translation).
Notice of Allowance in Korean Appln. No. 10-2022-7023090, mailed on Jan. 22, 2025, 5 pages (with English translation).
Office Action in Indian Appln. No. 202428008133, mailed on Apr. 17, 2025, 6 pages (with English translation).

* cited by examiner

USING SECURE MULTI-PARTY COMPUTATION TO IMPROVE CONTENT SELECTION PROCESS INTEGRITY

CROSS-REFERENCE TO RELATED APPLICATION

This application is a continuation application and claims priority under 35 U.S.C. § 120 to U.S. patent application Ser. No. 17/795,024, filed on Jul. 25, 2022, which application is a National Stage Application under 35 U.S.C. § 371 and claims the benefit of International Application No. PCT/US2021/054340, filed Oct. 11, 2021, which application claims priority to IL Application No. 279405, filed Dec. 13, 2020. The prior applications are considered part of and are incorporated by reference in the disclosure of this application.

TECHNICAL FIELD

This specification is related to data security and integrity.

BACKGROUND

Secure multi-party computation (MPC) is a cryptographic protocol that prevents access to data by distributing a computation across multiple parties such that no individual party can access another party's data. The MPC computing systems perform the computations using secret shares of the data.

SUMMARY

In general, one innovative aspect of the subject matter described in this specification can be embodied in a method that includes receiving, by a first server of a secure multi-party computation (MPC) system and from an application on a user device, a request for a digital component, parsing, by the first server, the request into two or more distinct sub-requests parts, transmitting, by the first server of the secure MPC system, each of the two or more distinct sub-requests to a different server, receiving, by the first server and from a separate server in response to transmitting the two or more distinct sub-requests, a first set of candidate selection values, performing, by the first server in collaboration with one or more second servers of the MPC system, a selection process to generate a selection result for a winning digital component, including merging, by the first server, the first set of candidate selection values and a set of cached selection values to create a final set of candidate selection values, sorting, by the first server, the final set of candidate selection values according to the values of the candidate selection values, and applying, by the first server, each rule of a set of two or more selection rules, and transmitting, by the first server in collaboration with the one or more second servers and to the user device, the selection result for the winning digital component.

These and other implementations can optionally include one or more of the following features. In some implementations, the method includes receiving, by the first server of the secure MPC system and from the application on the user device, a notification including data indicating that the winning digital component was presented at the client device. In some implementations, the notification including data indicating that the digital component corresponding to the winning selection value was presented at the client device is received by the first server of the secure MPC system with a second request for a second selection value.

In some implementations, transmitting the selection result for the winning digital component from the final selection process includes receiving, by the first server of the secure MPC system and from each second server of the secure MPC system, a first secret share of the selection result and transmitting, by the first server of the secure MPC system and to the client device, (i) each first secret share of the selection result and (ii) a second secret share of the selection result.

In some implementations, receiving the first set of candidate selection values includes receiving, from the separate server, at least two secret shares for each candidate selection value of a first set of candidate selection values. In some implementations, the merging and the sorting can be performed by the first server as a single comparison-based sorting process.

In some implementations, the set of selection rules includes at least a privacy-preserving anonymity enforcement rule.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

The proposed structure uses a secure MPC process performed by two or more MPC servers operated by different parties to select digital components based on secret shares of user information to ensure that the user information cannot be accessed in plaintext or cleartext by either MPC server or another party absent unauthorized collusion between the MPC servers. This MPC process is used to enforce privacy-preserving measures and reduce transmissions between a requesting client device and the MPC cluster.

The MPC cluster also performs a final selection process and can transmit secret shares of a result that identifies a selected digital component that the MPC cluster selected using the secure MPC process directly to the requesting client device. Because the final selection process is performed at the MPC cluster instead of at the requesting client device, only the selection value for a winning digital component is transmitted to the requesting client device, rather than information for all or a large set of digital components. Reducing the need to transmit data reduces the amount of bandwidth consumed to transmit the information, reduces the latency in transmitting the information, and reduces the amount of processing power and associated battery power for devices running on batteries (e.g., mobile devices) required to transmit the information.

Furthermore, data that is cached locally at particular computing systems reduces latency for future requests of any cached data. Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

The process also reduces the potential for leakage of confidential information of content platforms that submit selection values for digital components to the MPC cluster by limiting the number of digital components for which information is provided to the client device. The described techniques provide a simplified process for maintaining a high level of privacy. The system provides a high bar for user privacy without requiring extensive changes from demand-side platforms.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
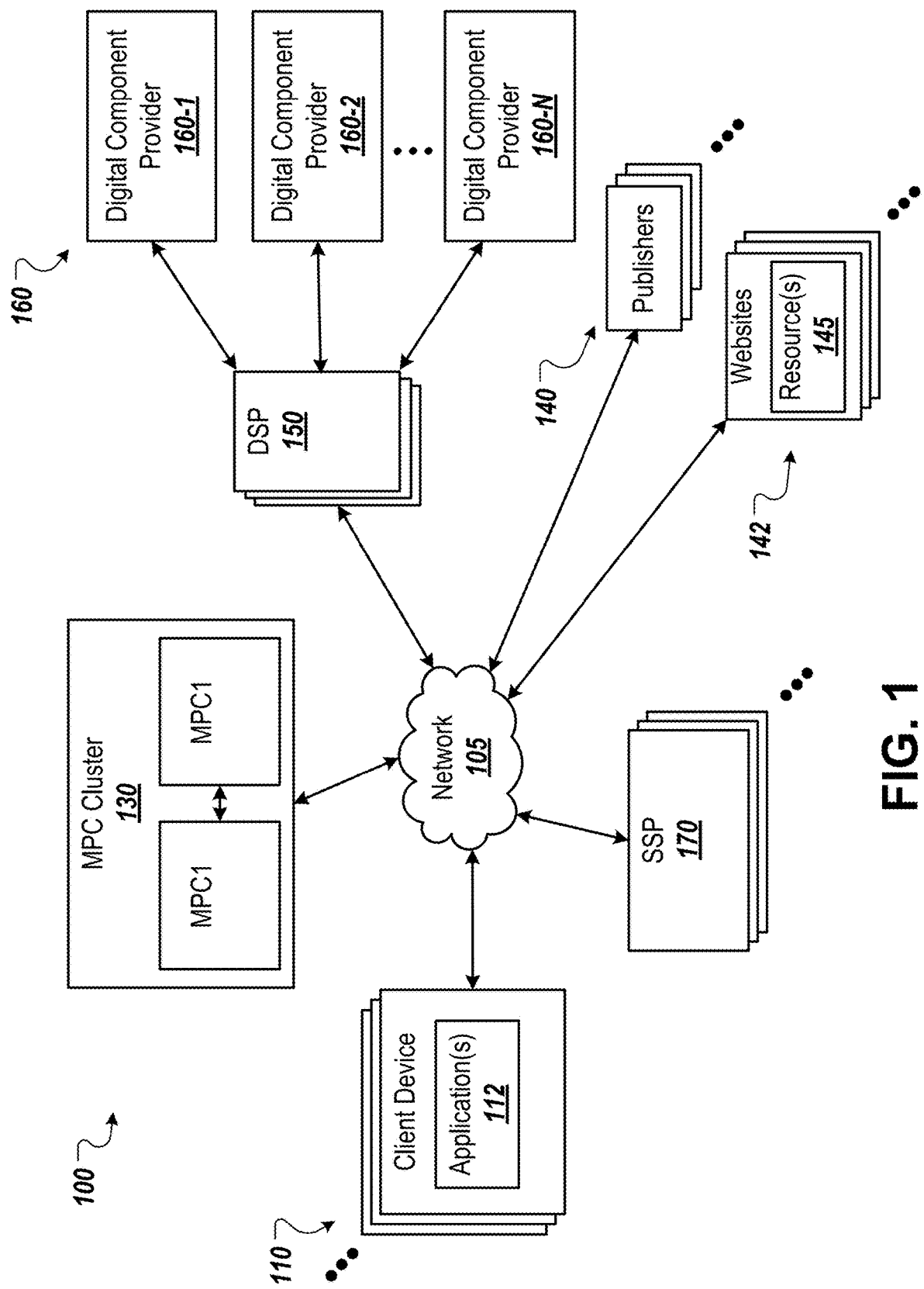
FIG. 1 is a block diagram of an environment in which an MPC cluster performs a secure MPC process to select digital components for distribution to client devices.

In general, this document describes systems and techniques for improving the integrity and protecting the security of information in content selection and distribution. An MPC cluster of server computers can perform a secure MPC process to select digital components based on user information without either MPC server being able to access the user information in cleartext absent unauthorized collusion. The user information can be sent to the MPC cluster using probabilistic data structures to reduce the data size of the information being transmitted over a network and to keep the information secure during the transmission. In some implementations, the user information can be sent to the MPC cluster using additional techniques, including distributed point functions.

The MPC cluster provides a secure environment for performing a selection process to select a selection value mapped to a digital component in response to a request for a digital component from a client device. Performing this selection process at the MPC cluster offers improved process integrity and user privacy over performing the final selection process at the requesting client device, which requires the transmission of securely determined candidates from the MPC cluster to the client device. Additionally, the client device presents an environment in which fraud prevention is more difficult-once selection value candidates are received, a final selection process is generally performed in cleartext, and can easily be manipulated. By performing the final selection process at the secure MPC cluster, the described system provides many advantages over performing the process at the client device.

For example, a client device could transmit a request for a digital components based on potentially sensitive information such as user groups to which a user may belong and a separate request for a digital component based on information that is not sensitive, such as the context in which the digital component would be presented for a single digital component slot in order to preserve user privacy. This process can result in the client device transmitting twice as many requests for digital components as the number of digital component slots available and receiving, in response to the requests, twice as many candidates from potentially multiple different servers. The extra requests and responses require additional bandwidth and battery power, which may diminish a user's online experience. The described system reduces the number of transmissions required between the client device and another server: Because the MPC cluster is performing the entirety of the selection process, the client device can send only one request to a server of the MPC cluster, and the client device can receive only one response from the MPC cluster.

In some cases, it is beneficial to a user to receive digital components (or other data) related to web pages, application pages, or other electronic resources previously visited and/or interacted with by the user. In order to distribute such digital components to users, the users can be assigned to user groups, e.g., user interest groups, cohorts of similar users, or other group types involving similar user data based on the digital content accessed by the user. For example, when a user visits a particular website and interacts with a particular item presented on the website or adds an item to a virtual cart, the user can be assigned to a group of users who have visited the same website or other websites that are contextually similar or are interested in the same item. To illustrate, if the user of the client device 110 searches for shoes and visits multiple webpages of different shoe manufacturers, the user can be assigned to the user group "shoes," which can include identifiers for all users who have visited websites related to shoes.

In some implementations, a user's group membership can be maintained at the user's client device 110, e.g., by a browser-based application, rather than by a digital component server, a content provider, or another party. The user groups can be specified by a respective label of the user group. The label for a user group can be descriptive of the group (e.g., gardening group) or a code that represents the group (e.g., an alphanumeric sequence that is not descriptive). The label for a user group can be stored in secure storage at the client device 106 and/or can be encrypted when stored to prevent others from accessing the list.

In some implementations, an identifier for a user group can be generated using hash-based message authentication code (HMAC) parameterized by the label of the user group and the domain of the content provider represented as HMAC (user_group_label, eTLD+1). In some implementations, the HMAC can be implemented using secure hash algorithm (SHA-256) which is a cryptographic hash function with a digest length of 256 bits to generate a hashed 256 bit (32 byte) output. In such an example, HMAC (user_group_label, eTLD+1) generates, as the user group identifier, a 256 bit unique identifier for the user group.

The user group membership of a user can be used to select digital components or other content that may be of interest to the user or may be beneficial to the user/client device in another way (e.g., assisting the user in completing a task). For example, such digital components or other content may include data that improves a user experience, improves the running of a user device, or benefits the user or client device in some other way.

The MPC cluster forwards the digital component request, or a portion thereof, to a supply-side platform (SSP) to solicit candidate selection values while shielding sensitive information, such as the IP address of the requesting client device, from the SSP. IP addresses are a strong fingerprinting signal, or information that can be used to identify a particular device and associate the device with its user, and hiding a device's IP address from an SSP improves user privacy.

Additionally, performing the entirety of the selection process at the MPC cluster, allows for uniform application of selection rules to all candidate selection values for a particular response to a digital component request. In selection processes in which the final selection is performed at the client device, the MPC cluster is only able to apply selection rules to the candidate selection values to which the MPC cluster has access, and not to the candidate selection values that the client device separately receives. This improves the consistency of a user's experience and reduces confusion that can arise, for example, when a user has specified a particular selection rule and the rule is enforced for some digital components and not enforced for others.

The MPC cluster implements a secret sharing algorithm to maintain the security of the selection process. In the described system, the MPC cluster can use a secret sharing algorithm, such as Oblivious Transfer extension (OTe) to securely evaluate Boolean operations required to be performed during the selection process. This algorithm minimizes the incremental computation cost and latency required to support applying selection rules.

FIG. 1 is a block diagram of an environment 100 in which an MPC cluster performs a secure MPC process to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 may include many different client devices 110, secure MPC clusters 130, publishers 140, websites 142, DSPs 150, and SSPs 170.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). In some implementations, application 112 can be a program such as an operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from an MPC cluster, such as the MPC cluster 130, that selects a digital component and provides the digital component to the application 112 for presentation to a user of the client device 110. As described below, the application 112 can request digital components from the MPC cluster 130, which can forward the request to other servers, such as SSP 170.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources and/or applications of multiple different publishers 140. In general, a DSP 150 can receive requests for digital components (e.g., from an SSP), generate (or select) a selection value for one or more digital components created by one or more digital component providers based on the request, and provide data related to the digital component (e.g., the digital component itself) and the selection parameter to an SSP. The selection value can indicate an amount that the digital component provider 160 is willing to provide for presentation or user interaction with the digital component. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160. The user groups can also be created by the content platforms, e.g., by DSPs 150 and/or SSPs 170.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The MPC cluster 130 can use the user group membership of a user to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process. The MPC cluster 130 also performs a final selection process using a set of candidate selection values received from the SSP 170 to select a winning selection value mapped to a digital component. The MPC cluster 130 then provides data for a digital component mapped to the winning selection value directly to client device 110 in response to the digital component request. The data can include, for example, data identifying the digital component, a location at which the digital component is stored and/or from which the digital component can be requested, and the winning selection value, among other parameters.

The secure MPC cluster 130 includes two computing systems MPC1 and MPC2 (e.g., server computers) that perform secure MPC processes to select digital components for distribution to client devices of users based on the user's group membership, but without accessing the group membership information (or other sensitive user information) in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

The computing systems MPC1 and MPC2 can be operated by different entities. In this way, each entity may not have access to the users' group membership in cleartext. For example, one of the computing systems MPC1 or MPC2 can be operated by a trusted party different from the users, the publishers 140, the DSPs 150, the SSPs 170, and the digital component providers 160. For example, an industry group, governmental group, or browser developer may maintain and operate one of the computing systems MPC1 and MPC2. The other computing system may be operated by a different one of these groups, such that a different trusted party operates each computing system MPC1 and MPC2. Preferably, the different parties operating the different computing systems MPC1 and MPC2 have no incentive to collude to endanger user privacy. In some implementations, the computing systems MPC1 and MPC2 are separated architecturally and are monitored to not communicate with each other outside of performing the secure MPC processes described in this document.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if content or communications are transmitted to the user from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
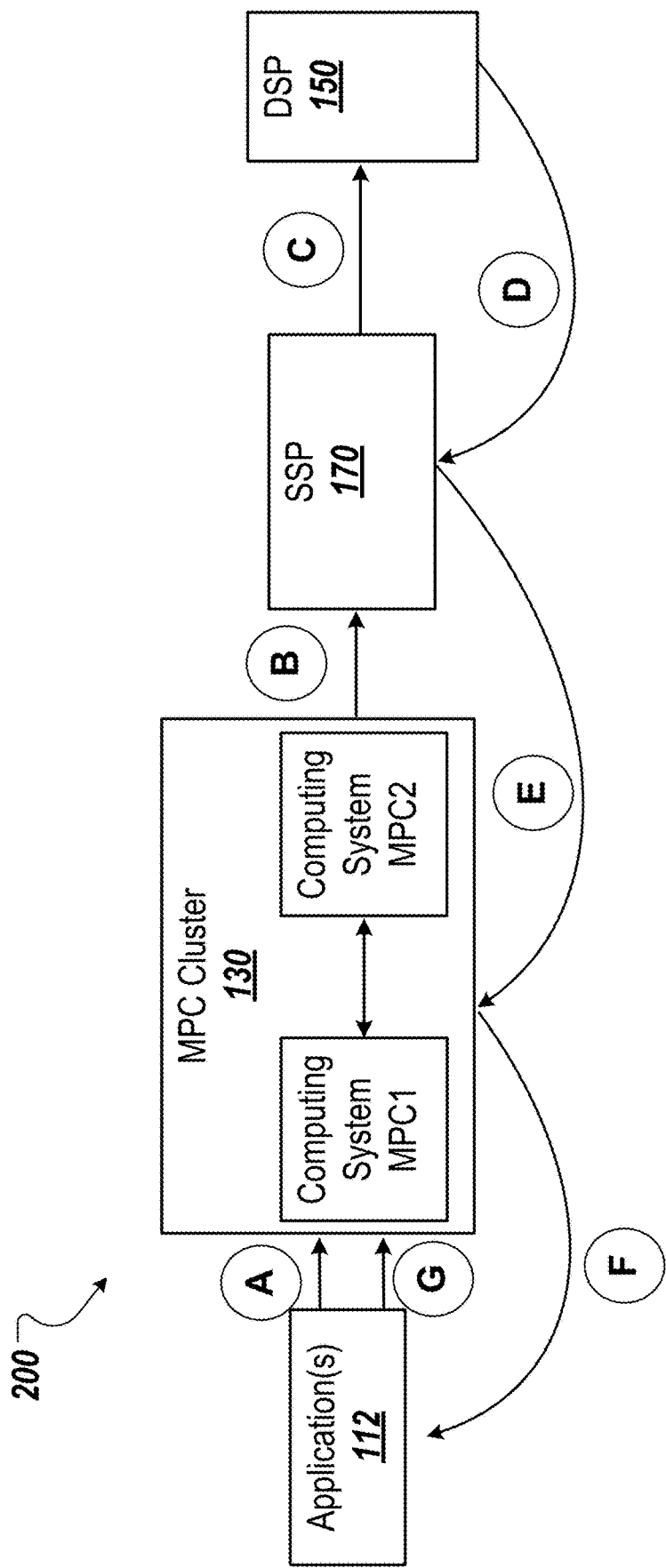
FIG. 2 is a data flow diagram of an example process for selecting a digital component for provision for display at or distribution to a client device.

FIG. 2 is a data flow diagram of an example process 200 for selecting a digital component for providing for display at or distribution to a client device. Operations of the process 200 can be implemented, for example, by the application 112 on client device 110, the computing systems MPC1 and MPC2 of the MPC cluster 130, DSP 150, and SSP 170. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

This description includes two types of selection values-selection values that are conditioned on either sensitive user information, such as user group membership or other business sensitive information, or parameters whose changes in value can allow unscrupulous parties to infer the sensitive information, or "conditional selection values" and selection values that are not conditioned on sensitive information, or "unconditional selection values." To protect user privacy, the conditions for "conditional selection values" are evaluated within MPC cluster 130 instead of SSP 170 or DSP 150 to determine whether "conditional selection values" are eligible for the content selection process.

This structure allows the MPC cluster 130 to protect user privacy and business confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computing systems of the MPC cluster 130 is honest, there is no leaking of confidential user data or business confidential information. If the MPC cluster 130 includes more than two computing systems, the current MPC protocol can be expanded, or other MPC protocols can be used.

The MPC cluster 130 runs the secure 2PC protocol to evaluate and apply conditions to select eligible selection process candidates, conduct selection processes to select a digital component based on a winning selection value (e.g., where the digital component is mapped to the winning selection value), and to receive impression notifications to update counters on which those conditions depend. All of these processes can be done using secret sharing techniques. This protocol is described in detail below with respect to FIG. 3.

The process 200 begins with stage A, in which application 112, in collaboration with a triggering element from a content distribution server, such as SSP 170, sends a request for a digital component to the MPC cluster 130. The application 112 can include multiple requests for digital components together into one combination request to fetch multiple digital components. The MPC cluster 130 can then serve each request in the combination request independently, or make one or more selection decisions holistically. In this example, the request is for a single digital component, and includes a request for a digital component that is selected based on sensitive information or a digital component that is selected without using sensitive information. The MPC cluster 130 can respond to the request by selecting a particular selection value from among a set of selection values that are each mapped to a respective particular digital component. These selection values can be selections values that were previously cached, or otherwise stored, at the MPC cluster 130 and/or selection values generated by a platform, such as DSP 150 or SSP 170, just-in-time (JIT) selection values. JIT selection values are generated directly in response to need, and increase efficiency and decrease waste, because the selection values are only generated when a digital component is needed. For example, JIT selection values can be generated when a digital component slot becomes available—this is indicated by the receipt of a request for a digital component.

The request contains information used in a digital component selection process, including information that can be sensitive, such as identifiers of user groups to which the application 112 is mapped or otherwise associated, and information that is not sensitive, such as contextual signals from the application 112 regarding the context in which the digital component will be presented and/or displayed. As described in further detail below, the design of system 110 improves the protection of user data that can be sensitive or confidential.

The triggering element can be, for example, a tag that detects the presence of a digital component slot within an internet location visited by application 112. The triggering element can be placed, for example, at the internet location and can inform the application 112 of the presence of a digital component slot for which a digital component should be requested.

The process 200 continues with stage B, in which the MPC cluster 130 transmits a digital component request that is based on information that is not sensitive, such as contextual signals, to SSP 170. This request is referred to as a "contextual request," and responses to this contextual request can be unconditional selection values, because the request is not conditioned on receiving sensitive information. The contextual request can contain various contextual signals and user information gathered directly by the internet location (e.g., a content publisher) that triggered the request for a digital component. For example, the contextual signals can include analytics data, language settings, and other data that assist the content publisher with providing a good user experience. The contextual request provided to SSP 170 does not, however, include sensitive information, such as user group identifiers.

The process 200 continues with stage C, in which SSP 170 forwards the contextual request to one or more DSPs 150. In this particular example, and for simplicity, SSP 170 forwards the contextual request to a single DSP 150. For example, SSP 170 can forward the contextual request to DSP 150. In this example, DSP 150 has digital components and selection values mapped to the digital components.

The process 200 continues with stage D, in which the one or more DSPs 150 return selection values in response to the contextual request. For example, DSP 150 returns one or more selection values mapped to digital components responsive to the contextual request. DSP 150 can return any number of selection values responsive to the contextual request. In some implementations, DSP 150 can additionally return selection values responsive to a digital component request based on sensitive information, such as user group information. These selection values are "conditional selection values" because they are conditioned on sensitive information, and thus are conditioned on the MPC cluster 130 receiving a request that includes sensitive information matching the sensitive information on which the selection values are conditioned. For each selection value that DSP 150 provides, DSP 150 includes information such as a time-to-live (TTL) parameter, i.e. the maximum timespan that the MPC cluster 130 may cache the selection value. This TTL parameter enables the MPC cluster 130 to cache selection values received from DSP 150. In some implementations, without a TTL parameter, the MPC cluster 130 does not cache received selection values, and instead will discard the selection values after the selection values have been used in a selection process, e.g., in the selection process corresponding to the digital component request transmitted in stage A, B and C.

The process 200 continues with stage E, in which SSP 170 applies content selection rules. For example, SSP 170 applies rules such as content provider and digital component blocking rules, that prevent particular content providers from being eligible to provide candidate digital components and selection values, or particular digital components from being candidates. In some implementations, the application 112 can maintain a set of blocked identifiers that includes identifiers of digital components that have been expressly blocked by the user. For example, assume that a user interacts with a mute element corresponding to a given digital component (or a portion of data that was delivered to the client device 110). In this example, the user's interaction with the mute element is an indication that the user does not want to see that digital component, or potentially similar digital components (e.g., from a content source or campaign, which can be the same content source or campaign or can be a different content source or campaign), in the future (e.g., for at least a certain amount of time). In response to the interaction the application 112 can add the identifier for the given digital component to the set of blocked universal identifiers, which can then be used to prevent delivery or presentation of other digital components having the same identifier as the given digital component. In some implementations, the application 112 can maintain a set of blocked identifiers that includes identifiers of digital components that have been shown to the user too often recently e.g. more than X times during the most recent Y minutes. The application 112 can add the identifier for the given digital component to the set of blocked universal identifiers, which can then be used to prevent delivery or presentation of other digital components having the same identifier as the given digital component in the near future.

SSP 170 also applies selection value rules to determine, for example, how selection values affect post-publishing values for particular content providers. Post-publishing values can indicate, for example, an amount that is provided to a content provider for publishing the digital component. The SSP 170 then performs a selection process to determine a top unconditional selection value, the unconditional selection value that yields the highest post-publishing value. An unconditional selection value is not conditioned on sensitive information, and therefore content selection rules such as user group membership, frequency control, content distribution rules, and pacing rules are not applied. The SSP 170 then forwards the following, which are JIT selection values, to the MPC cluster 130: all selection values that enable caching in the MPC cluster 130 (selection values having TTL values) and all selection values whose post-publishing value is no less than the post-publishing value of the top unconditional selection value.

The process 200 continues with stage F, in which the MPC cluster 130 updates its cache with JIT selection values received that enable caching (i.e., have TTL values). In addition, the MPC cluster 130 applies selection rules, such as user membership rules, frequency control, pacing rules, and rules to prevent micro-targeting of a particular user to all selection values received in stage E, as well as to previously cached selection values to select valid candidates for the selection process. The rules can include restrictions and guidelines on the manner or frequency of distribution of a digital component, among other factors. The rules include frequency control, muting, budget, and pacing constraints. The MPC cluster 130 then runs the final selection process among all eligible candidates, selects a winning selection value, and then returns data for a digital component mapped to the winning selection value to the application 112 in response to the digital component request.

The process 200 continues with stage G, in which the digital component mapped to the winning selection value is rendered by application 112. Application 112 then provides an impression notification to the MPC cluster 130. This impression notification includes data that allows the MPC cluster 130 to update information relevant to updating counters that allow the MPC cluster 130 to enforce selection rules. In some implementations, application 112 may send the impression notification G to MPC cluster 130 by piggyback on top of a future component request A to reduce the number of network communications and battery/bandwidth consumption for mobile devices.

Figure 3:
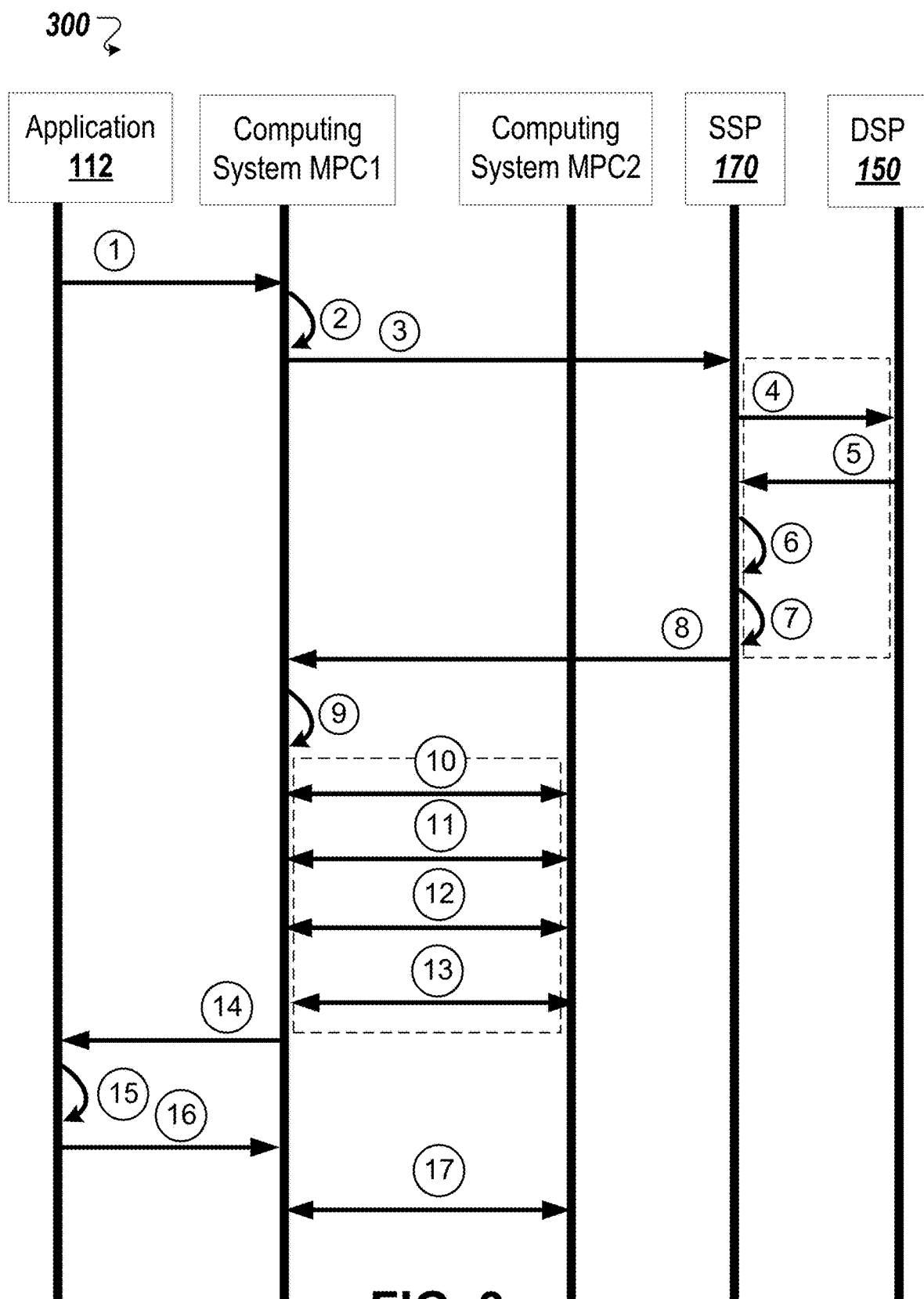
FIG. 3 is a swim lane diagram of an example process for selecting a digital component for provision for display at or distribution to a client device.

FIG. 3 is a swim lane diagram of an example process 300 for selecting a digital component for providing for display at or distribution to a client device. Operations of the process 300 can be implemented, for example, by the application 112 on client device 110, the computing systems MPC1 and MPC2 of the MPC cluster 130, DSP 150, and SSP 170. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computing system MPC cluster 130, MPC clusters having more than two computing systems can also be used to perform similar processes. In this particular example, the two computing systems MPC1 and MPC2 have identical software and functionality but are managed by different entities that have no incentive to collude to compromise user privacy.

The MPC cluster performs a secure MPC process to select a digital component based on the characteristic information in the digital component request, such as the user group information. This can also include identifying selection values for digital components that are candidates for selection based on the digital components having a user group identifier that matches one of the user group identifiers for the user. This can also include selecting a digital component from the candidate digital components based on the selection values for the digital components. These selection values include selection values cached at the MPC cluster and selection values received from other servers in response to a request for selection values, and some selection values can be conditioned on sensitive information. This can all be performed without either computing system MPC1 or MPC2 from accessing the user group identifiers in cleartext.

The computing systems MPC1 and MPC2 can identify the candidate selection values using secure MPC techniques using secret shares such that neither computing system MPC1 nor MPC2 knows which digital components are candidates or the user groups that include the user as a member. To do this, computing system MPC1 calculates a first share of a candidate parameter for each conditional selection value in a set of conditional selection values that may potentially serve the current digital component request. Similarly, computing system MPC2 calculates a second share of the candidate parameter for each conditional select value in the same set of conditional selection values. The conditional selection value can be a Boolean value (e.g., zero or one) that indicates whether the selection value associated with a digital component and optionally the user group identifier is candidate.

The computing systems MPC1 and MPC2 can compute the secret shares for the result of the selection processes using secure MPC techniques with one or more roundtrips between the computing systems. That is, the computing systems MPC1 and MPC2 can determine the secret shares for the winning selection value, data identifying its corresponding digital component, and/or data identifying a network location from which the digital component can be downloaded by a client device.

Once the secret share computation is completed, MPC1 and MPC2 can each return one of the shares of the selection result to the client device. The client device can then reconstruct the selection result in cleartext using the two secret shares.

The flow 300 begins with step 1, in which application 112 generates a digital component request to transmit to the MPC cluster 130. Application 112 chooses one of the computing systems of MPC cluster 130 to which the request will be transmitted. This selection process can be arbitrary, and in this example, for simplicity, the chosen computing system is MPC1.

This initial ad request contains three types of information: a digital component request based on sensitive information for each of the computing systems MPC1 and MPC 2, and a digital component request based on non-sensitive information for the SSP 170.

To securely and efficiently generate a digital component request based on sensitive information, the application 112 can use probabilistic data structures, such as a cuckoo filter or Bloom filter. In this example, the probabilistic data structure is a cuckoo filter. In general, a cuckoo filter includes an array of buckets where each bucket can hold b fingerprints. The fingerprint of an item is a bit string derived from the hash of that item. A cuckoo filter uses n hash functions that allows an item to be placed in n different buckets in any of the b positions. Typically, a cuckoo filter is identified by the number of fingerprints in each bucket and the number of buckets. For example, a (2, 4) cuckoo filter has 2 buckets and each bucket in the cuckoo array can store up to 4 fingerprints. Therefore, the total capacity of the cuckoo filter is 2×4 or 8 fingerprints.

Depending on the configuration of the cuckoo filter, an item can be inserted into a Cuckoo filter in one of N possible locations, e.g. N=2. The application 112 uses N pseudo random functions (PRF) parameterized by either a user group identifier or an identifier from the set of blocked identifiers and either of two random variables generated by the application 112 to determine all possible locations for the item to be inserted. For example, assume that the two random variables generated by the application 112 are rand_var1a and rand_var1b. In some implementations, the application 112 and the MPC cluster 130 agree on a PRF in advance, where PRF $(x,y) \in [0, 2^k-1]$ where k is the number of bits in each item in a bucket of the cuckoo filter. Each location of the cuckoo filter can be occupied by a user group identifier or a blocked identifier, or empty. For example, the application 112 can generate a cuckoo filter table whose elements are PRF(ug_id, rand_var1a), PRF(blocked_uid, rand_var1b), and 0, where ug_id is the identifier of the user group generated by applying HMAC on the label of the user group based on the domain of the content provider, blocked_uid is an identifier from a set of blocked identifiers, and 0 represents an empty item. The process is repeated on all user group identifiers and all identifiers in the set of blocked identifiers.

The application 112 can generate a vector B based on a cuckoo filter table generated for the user group identifiers and the universal identifiers in the set of blocked universal identifiers. The vector B can be represented as Bi=Ai−PRF (rand_var2, i) where $A_i$ is the cuckoo filter table and i is the index of the vector B and cuckoo filter table A. When the application 112 initiates a request for a digital component for a digital component slot, the application transmits rand_var1a, rand_var1b and rand_var2 as request parameters to MPC1. The application 112 also transmits the vector B and rand_var1 as request parameters to MPC2. Because neither of the computing systems MPC1 and MPC2 have access to all request parameters, neither of the computing systems can recreate the cuckoo filter table, preserving user privacy.

The application 112 can then transmit a digital component request that includes a corresponding secret shares to the corresponding computation server of the MPC system. For example, the application 112 generates and transmits a digital component request to MPC1 that includes the first secret share of the probabilistic data structure (i.e., cuckoo filter), which can be vector B described in the previous paragraph. The parameters include rand_var1a and rand_var1b, as well as contextual signals from the location that triggered the digital component request to be generated and transmitted. Similarly, the application 112 also transmits a request for digital component to MPC2 that includes the second secret share of the probabilistic data structure that is defined by rand_var2 via function PRF(rand_var2, i) where i is the index of the array of secret shares, as well as rand_var1a and rand_var1b. Additional data included in a digital component request can include contextual selection signals that indicate the context for which the digital component is eligible, e.g., location of client device 110, spoken language selected for the application 110, Universal Resource Locators (URL) for resources with which the digital component can be presented and/or excluded URLs for resources with which the digital component cannot be presented. This data for a digital component can also identify the digital component, e.g., using a unique identifier, a domain from which the digital component can be obtained, and/or other appropriate data for the digital component.

The application 112 encrypts the digital component requests based on sensitive information because if MPC1 can access the request parameters intended for MPC2, MPC1 can reconstruct the cuckoo filter table A and recover the user group identifiers, and thus breach the privacy of the user of the application 112. For example, application 112 can encrypt the digital component request for MPC2 using public key encryption and MPC2's public key: PubKeyEncrypt(rand_var1a||rand_var1b||rand_var2|| other signals, MPC2), where || is any reversible method that can be used to compose a complex message from simple messages, such as protocol buffer or JSON. By using the function PubKeyEncrypt( ), the parameters within the parentheses are encrypted using a public key algorithm and a public key of MPC2 such that MPC2 can use the corresponding private key to decrypt the shares. If encrypted, the application 112 can send, to MPC1, the digital component request for MPC2 and MPC1 can forward this encrypted request to MPC2. In this way, the application 112 can send a single request to MPC1 that includes three sub-requests, e.g., a contextual request that includes the contextual signals and two user group requests (i.e., a conditional request that is conditioned on the user group information). The first user group sub-request is for MPC1 and the second user group sub-request is an encrypted user group request for MPC2. The second sub-request is encrypted such that MPC1 cannot access the information, and must simply forward the share to MPC2.

To securely and efficiently generate a digital component request based on non-sensitive information, such as contextual signals, for SSP 170, the application 112 uses contextual signals, including arbitrary signals such as signals specifically for a particular content provider, but does not include user group identifiers or blocked identifiers, which are only provided with digital component requests based on sensitive information.

To minimize the risk to user privacy, and preserve the integrity of the process, the application 112 encrypts the digital component requests intended for SSP 170 based on non-sensitive information using public key encryption. For example, application 112 can encrypt digital component request for SSP 170 using public key encryption and SSP 170's public key: PubKeyEncrypt(digital_component_request, SSP).

The flow 300 continues with step 2, in which MPC1 parses the initial digital component request to obtain each of the three sub-requests. For example, MPC1 receives the digital component request. In some implementations, the request can be parsed into sub-requests and parses the request into the three sub-requests so that the sub-requests can be forwarded to separate recipients. For example, the contextual request can be forwarded to the SSP, the user group request can be kept and processed by MPC1, and the encrypted user group request can be forwarded to MPC2.

The flow continues with step 3, in which MPC1 fetches JIT selection values from the SSP 170 and DSPs 150 with a contextual, or unconditional, digital component request, which is a sub-request in Step 1. Some JIT selection values are conditional, depending on, for example: (1) whether the user is a member of a particular user group, (2) applicable selection rules, such as frequency control or pacing rules, and (3) whether the digital components creatives associated with the selection values satisfy rules to prevent micro-targeting. In some implementations, the JIT selection values can be cached by the MPC cluster 130 according to TTL information provided with the selection values.

Micro-targeting is a selection process that narrowly targets users to an extent that some users may not feel comfortable with. For example, a digital component that is targeted at, and distributed to, only a few users may feel too personalized, and a user may feel singled out or uncomfortable with the specificity of the digital component. By ensuring that a particular digital component is provided to a threshold number of other users, the system ensures that digital components are distributed to a sufficiently broad audience such that a user feels comfortable with the digital components they receive and with the size of the digital component's target audience through enforcing k-anonymity. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components at least k times, such that anonymity within a set of at least k users is preserved. In some implementations, each of the k times that the digital component was distributed must be for a different device or a different user. The system enforces k-anonymity through the use of a privacy-preserving data structure. The distribution of a particular digital component can be tracked within a privacy-preserving data structure, such as a counter for the number of times that the digital component has been selected for distribution, or actually presented to users.

Additionally, users generally prefer to not be continually shown the same third party content as they navigate across multiple different websites, such that continually distributing the same third-party content to the same user across multiple different websites results in wasted computing resources that are used to distribute content that the user does not want to see, and will likely ignore. One way to limit the number of times a particular user is exposed to the same third-party content is to utilize frequency control techniques that prevent the same user from being exposed to the same third-party content more than a specified number of times within the most recent specified period of time.

The system allows for further user input by receiving information from the user to mute a digital component, or prevent a digital component from being presented to them for a period of time. For example, a user can choose to mute a particular digital component that they have been presented with for a period of five days. In some implementations, the time period can be specified by the client device 110, MPC cluster 130, DSP 150, digital content provider 160, or SSP 170, based on the type of content item and/or the type of feedback provided by the user, among other factors.

The distribution of content can also be controlled by input from the digital component providers 160 through pacing control techniques. A digital component provider can specify a total threshold value over a period of time for the selection values to implement measures to ensure that resources for a campaign, or set of digital components, that includes the digital component are not exhausted early in a campaign period. For example, a digital component provider 160 can specify that the total of selection values for selected digital components from the digital component provider 160 or for a particular digital component over the course of a week is limited to a maximum value of 8000 units. Once the maximum total of selection values is reached, the particular digital component for which the maximum is imposed will no longer be eligible for a selection process to be distributed to a client device 110 until the period of time, e.g., the week, is over.

A digital component provider can also specify a velocity, or a pace, at which a threshold value of selection values for selected digital components from the digital component provider 160 or for a particular digital component is being reached. For example, a digital component provider 160 can specify that a maximum threshold value of 6000 units must be reached at a pace of less than 250 units per day over the course of a month. Once the daily total of selection values is reached, digital components provided by the digital component provider 160 for which the pacing is imposed will no longer be eligible for a selection process to be distributed to a client device 110 until the period of time, the day, is over. Additionally, the pacing can be based on a pace at which a particular digital component is selected and delivered to a user device, or a pace at which a particular digital component is interacted with by users to whom the particular digital component has been delivered, among other metrics.

In addition to performing a selection process that enforces content selection and user preference rules, the system can improve security by preventing the MPC cluster 130 from accessing the JIT selection values in cleartext. The SSP 170 can split each JIT selection value into secret shares prior to transmitting the selection values to the MPC cluster 130.

Furthermore, the SSP 170 can sort the JIT selection values according to their post-publication values.

In steps 4 through 6, the SSP 170 requests selection values from the DSPs 150s, receives the candidate selection values from the DSPs 150, and performs an initial selection process. In step 4, SPP 170 transmits a contextual digital component request to DSP 150.

In step 5, DSP 150 returns selection values mapped to particular digital components. The selection values can include unconditional selection values and conditional selection values.

In step 6, SSP 170 applies content provider and digital component blocking rules that prevent particular content providers from being eligible to provide candidate digital components and selection values, or particular digital components from being candidates. Additionally, SSP 170 performs an initial selection process to choose one unconditional selection value from among the candidate unconditional selection values and one conditional selection value. The conditional selection values can be used to replenish the cache for the MPC cluster 130 used for later requests from application 112.

In step 7, SSP 170 computes the post-publishing value based on the selection values and information provided by the DSP 150. For example, SSP 170 can compute an amount to be provided to a content publisher for displaying the digital component mapped to the selection value.

In step 8, SSP 170 returns both conditional selection values and unconditional selection values to the MPC cluster 130. The SSP's response to MPC1 has the following parameters: $\{[jit\_sv_{1,1}] \ldots [jit\_sv_{n,1}]\}$ where n is the number of JIT selection values, PubKeyEncrypt ($\{[jit\_sv_{1,2}], \ldots [jit\_sv_{n,2}]\}$, MPC2), $\{cache\_ttl_1, \ldots cache\_ttl_n)\}$, and $\{post\_publishing\_value_1, \ldots post\_publishing\_value_n\}$. As described above, PubKeyEncrypt is a public key encryption algorithm, and allows the SSP 170 to transmit a single response to MPC1 that includes the response to MPC2 without allowing MPC1 to access the response data. Parameters appearing in brackets represent secret shares of the variable within the brackets. For example, here, $[jit\_sv_{i,1}]$ and $[jit\_sv_{i,2}]$ are the two secret shares of $jit\_sv_i$, which represents a JIT selection value. With respect to secret shares, the subscript 1 indicates a parameter representing a first secret share and the subscript 2 indicates a parameter representing a second share. In some implementations, $jit\_sv_i$ includes data identifying the selection value and a digital component to which the selection value is mapped, and parameter values corresponding to parameters specified in a digital component request, among other data. The SSP 170 can split $jit\_sv_i$ into its secret shares and reconstructing $jit\_sv_i$ from its secret shares can be performed using a suitable cryptographic library that supports secret share algorithms. For example, using an additive secret share library, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc. The parameter $cache\_ttl_i$ represents a TTL value for each selection value i, and $publisher\_value_i$ represents a post-publishing value for each selection value i.

The selection result can include the selection value and/or data for the digital component corresponding to the selection value. For example, the selection result can be a data array that includes the digital component or a URL or other resource locator that references a network location where the client device 110 can obtain the digital component. In this way, the client device 110 can display the winning digital component after combining the secret shares of the selection result.

The process 300 continues with steps 9 and 10, in which the computing system MPC1 merges cached and received JIT candidate selection values, in which computing system MPC1 parses the response from SSP 170. First, in step 9, MPC1 parses the response received from the SSP 170.

The process 300 continues with step 10, in which computing system MPC1 transmits a request with the following parameters to MPC2: PubKeyEncrypt ($\{[jit\_sv_{1,2}], \ldots [jit\_sv_{n,2}]\}$, MPC2), $\{cache\_ttl_1, \ldots cache\_ttl_n\}$, and $\{post\_publishing\_value_1, \ldots post\_publishing\_value_n\}$. These are values that MPC1 received from SSP 170 in step 8, and the subscript 2 here represents a second secret share of the values $jit\_sv_i$. Afterward, MPC1 performs an efficient, general-purpose, comparison-based sorting algorithm, such as a merge-sort operation, to merge cached selection values associated with signals from the original request received in step 1. For example, the merge-sort operation can include dividing the unsorted list of cached selection values and received selection values into n sublists, each containing one element (where a list of one element is considered sorted) and then repeatedly merging the sublists to produce new sorted sublists until there is only one sublist remaining, which is the final sorted list. Merge sort is particularly suitable for this scenario because both the list of cached selection values and the selection values received from the SSP 170 in Step 8 can be pre-sorted.

The sorting process merges the JIT selection values and cached selection values into one sequence of selection values (in the form of secret shares) ordered according to their post-publishing values. In parallel, MPC2 performs the same merge-sort process on its secret shares of both cached selection values and JIT selection values.

The merge-sort process results are used for two reasons, to update the cached selection values that may exist in sorted sequences at the MPC cluster 130, and to prepare the list of candidate selection values. The input to the final selection process is the list of candidate selection values prepared by the merge-sort process. In addition, the final selection process input also includes any number of user group identifiers and blocked identifiers encoded in the probabilistic data structure received from the application 112 in step 1, and counters or other data structures to support enforcing selection rules.

The final selection process of process 300 includes two sequential stages, steps 11 and 12. All computations for the final selection process are performed over secret shares. Although later sections may describe some computations in terms of cleartext, it is purely for the purpose of brevity and clarity.

For each cached or received selection value that is used in the final selection process (i.e., selection value in the final list resulting from the merge-sort process performed in step 10), the MPC cluster 130 conceptually computes a variable value $is\_candidate_x$ for each selection value x. MPC1 calculates one secret share of $is\_candidate_x$, denoted as $[is\_candidate_{x,1}]$ and MPC2 calculates the other secret share of $is\_candidate_x$, denoted as $[is\_candidate_{x,2}]$. MPC1 and MPC2 can collaboratively calculate the secret shares using a secure MPC process.

In step 11, MPC1 determines whether each candidate selection value is associated with a user group specified in the request received in step 1. MPC1 receives the equivalent of an array of secret shares for the cuckoo filter table M in step 1, denoted by [M1]. Each user group identifier present in M will be in one of N possible locations. If a selection value x is associated with a user group specified in the request received in step 1 (i.e., the user group identifier for the selection value x exists within the probabilistic data structure from in step 1), then the selection value x must exist in one of N possible locations.

MPC1 calculates [is_candidate$_{x,1}$] according to the following equation:

$$0 == \prod_{i=1}^{N}\left(\left[M_{F_i(ug_{id(x)}),1}\right] - PRF(ug\_id(x), rand\_val1a)\right)$$

where $\Pi$ denotes the multiplication of multiple items. Here, ug_id(x) is a function used to retrieve ug_id associated with a selection value x, $\{F_1, \ldots F_N\}$ is a function to calculate possible index (i.e. location) of an item within the cuckoo filter table A, and rand_val1a is a random value received in Step 1. [M$_{x,1}$] is the x-th element in the array [M$_1$]. == is the equality test between a cleartext integer and a secret share of a secret integer. The result of == is a secret share of a secret integer that is either 0 (not equal) or 1 (equal). Here, the value of [M$_{i,1}$]=Bi defined above.

Similarly, MPC2 calculates [is_candidate$_{x,2}$] according to the following equation:

$$0 == \prod_{i=1}^{N}\left(\left[M_{F_i(ug_{id(x)}),2}\right] - PRF(ug\_id(x), rand\_val1a)\right)$$

Here, the value of [M$_{i,2}$]=PRF(rand_val2, i).

When [is_candidate$_{x,1}$] and [is_candidate$_{x,2}$] are combined, it becomes clear that is_candidate$_x$ is 1 if the ug_id of the selection value x is in the probabilistic data structure table. The false positive rate of the cuckoo filter is controlled by the length (i.e. number of bits) of the entries in the cuckoo filter, k, and can affect the candidacy of the selection value. Otherwise, is_candidate$_x$ is 0.

In this particular example, the user group check occurs after the MPC cluster 130 receives the unconditional selection value response in step 8 from the SSP 170. In some implementations, the MPC cluster 130 performs the user group check in parallel with sending the contextual digital component request in Step 3 and receiving the contextual digital component response in Step 8.

In this particular example, the contextual digital component can contain conditional selection values from the DSPs 150 via the SSP 170, and the MPC cluster 130 can perform the user group check to those JIT conditional selection values, which may be potentially eligible for the final selection process in Step 13 and may become the winner for the current digital component request received in Step 1, if and only if the JIT conditional selection values can satisfy rules that prevent micro-targeting of users. In the alternative design, JIT conditional selection values are ineligible for the final selection process and cannot be the winner for the current digital component request. In addition, the DSPs 150 and SSP 170 have the opportunity to customize the look up key for the cache, which provides additional flexibility to the DSPs and SSP.

However, the latency of performing the user group check after receiving the conditional selection values will increase the overall latency of the total process 300, as shown between Steps 1 and 14. For example, even the most efficient secret share equality test requires three roundtrip remote procedure calls (RPCs) between the computing systems of the MPC cluster 130, which can take between tens and hundreds of milliseconds depending on the network condition and the equality test algorithm of choice.

The process 300 continues with step 12, in which the MPC cluster 130 applies selection rules—MPC1 and MPC2 collaborate to apply the selection rules. Each of the following rules is optional, and if a particular selection rule is not required for a particular selection process, then the selection rule is not applied.

For example, MPC cluster 130 can optionally apply a rule in which a particular digital component identifier mapped to a particular selection value is on a block list, and therefore is ineligible for the selection process. Here, block_id(x) is a function to retrieve block_id associated with a selection value x. MPC1 can calculate:

[should_block$_{bid,1}$] =

$$0 == \prod_{i=1}^{N}\left(\left[M_{F_i(block_{id(x)}),1}\right] - PRF(block\_id(x), rand\_val1b)\right)$$

Similarly, MPC2 can calculate:

[should_block$_{bid,2}$] =

$$0 == \prod_{i=1}^{N}\left(\left[M_{F_i(block_{id(x)}),2}\right] - PRF(block\_id(x), rand\_val1b)\right)$$

If should_block$_x$ can be reconstructed from [should_block$_{x,1}$] and [should_block$_{x,2}$], it is clear that should_block$_x$ is 1 if the block_id of the selection value x is in the probabilistic data structure. The FPR of the probabilistic data structure is controlled by the length of the entries in the structure. In the case that should_block$_x$ is 1, the MPC server 130 should set is_candidate$_x$ to 0 because the identifier should be blocked, and therefore is not eligible to be a candidate. For example, for a 2 location cuckoo filter, if the block_id of the selection value x is not in the probabilistic data structure, i.e. the block_id doesn't match the item in either one of the two Cuckoo filter locations, should_block$_x$ is 0. In this case, the MPC cluster 130 should not modify the value of is_candidate$_x$ because the identifier should not be blocked, and therefore should_block$_x$ does not affect whether the selection value x is eligible to be a candidate.

In order to modify is_candidate$_x$ according to the value of should_block$_x$, MPC1 calculates [is_candidate$_{x,1}$]=[is_candidate$_{x,1}$]×(1−[should_block$_{x,1}$]). Similarly, MPC2 calculates [is_candidate$_{x,2}$]=[is_candidate$_{x,2}$]×(1−[should_block$_{x,2}$]).

Next, the MPC cluster 130 can optionally apply pacing selection rules provided by content providers. For each digital component request, the MPC cluster 130 conceptually randomly generates rules_selector$_{runit\_id}$ in secret shares for each unit of selection value to which the selection rules are applied, or an runit_id. A function runit_id(x) fetches the runit_id for a selection value x.

For example, MPC1 first randomly generates [rules_selector$_{runit\_id,1}$]. MPC1 then modifies is_candidate$_x$ according to the value of rule_selector$_{runit\_id}$, MPC1 calculates [is_candidate$_{x,1}$]=[is_candidate$_{x,1}$]×(1−[rule_selector$_{runit\_id(x),1}$]).

Similarly, MPC2 calculates [is_candidate$_{x,2}$]=[is_candidate$_{x,2}$]×(1−[rule_selector$_{runit\_id(x),2}$]).

Here, when the maximum total selection value for a unit runit_id is exhausted, rules_selector$_{runit\_id}$ is set to 0. Additionally, when the pace at which a threshold value of selection values for selected digital components is reached is behind a target pace, rules_selector$_{runit\_id}$ has an increased probability of being 1. For example, MPC1 increases the possibility of rules_selector$_{runit\_id}$ being 1 when randomly generating the value of rules_selector$_{runit\_id}$. If the pacing is ahead of a target pace, rules_selector$_{runit\_id}$ has a decreased probability of being 1.

Next, the MPC cluster 130 can optionally prevent microtargeting by enforcing k-anonymity. Here, aggregate_id is the unit of selection values for which k-anonymity is enforced and a function aggregate_id(x) is used to fetch aggregate_id for a selection value x. The aggregate_id can be the campaign ID of a particular digital component which is mapped to one or more selection values. In some implementations, aggregate_id and runit_id are the same.

MPC1 enforces k-anonymity by asynchronously updating satisfy_k_anonymity$_{aggregate\_id(x)}$ for each cached selection value x in secret shares. For example, MPC1 maintains [satisfy_k_anonymity$_{aggregate\_id(x),1}$] asynchronously and calculates [is_candidate$_{x,1}$]=[is_candidate$_{x,1}$]×[satisfy_k_anonymity$_{aggregate\_id(x),1}$].

Similarly, MPC2 calculates [is_candidate$_{x,2}$]=[is_candidate$_{x,2}$]×[satisfy_k_anonymity$_{aggregate\_id(x),2}$].

After steps 11 and 12, MPC 1 and MPC 2 have calculated [is_candidate$_{x,1}$] and [is_candidate$_{x,2}$] respectively, i.e., the two secret shares of secret message is_candidate$_x$. Here, the result is that is_candidate$_x$=1 if selection value x is eligible for the final selection process performed by the MPC cluster 130 before a winning selection value mapped to a digital component is provided to the client device 110 for presentation and/or display. is_candidate$_x$=0 if selection value x is not eligible for the final selection process.

The above description relates to multiplication between secret shares of secret integers whose value is either 0 or 1 to computer logical AND. The above description also relates to 1 minus a secret share of a secret integer whose value is either 0 or 1 to computer logical NOT. In some implementations, alternative solutions can be adopted to evaluate logical expressions with secret shares. For example, to compute the logical AND of additive several secret shares of secret integers whose value are either 0 or 1, the MPC cluster can compare the sum of those additive secret shares to the number of secret shares. In another example, to compute an arbitrary logical expression with secret shares as input, the MPC cluster can adopt the truth table approach, i.e. MPC1 can build a truth table that contains one row for each possible combination of input secret shares held by MPC2. MPC1 randomly chooses a secret share for the result, denoted as [result1]. For each row, MPC1 can combine its input secret shares and the speculative input secret shares held by MPC2 to reconstruct the input to the logical expression in cleartext, then evaluate the result of the logical expression. For each row, MPC1 splits the result to two secret shares, one of which is [result1], the other is [result2]. MPC1 then writes [result2] to the row in the truth table. After MPC1 completes the construction of the truth table, MPC2 can initiate an Oblivious Transfer extension (OTe) to fetch the row in the truth table corresponding to the input secret shares held by MPC2. The fetch result is [result2]. At the end of the above process, MPC1 and MPC2 hold [result1] and [result2] respectively, which are the secret shares of the logical expression result. MPC1 has no knowledge of the value of [result2], and MPC2 has no knowledge of the value of [result1]. In some implementations, MPC1 and MPC2 can evaluate the logical expression to determine [is_candidatex,1] and [is_candidatex,2] by constructing a garbled circuit.

In step 13, the MPC cluster 130 performs the final selection process. Conceptually, the MPC cluster 130 calculates an accumulated value for a given selection value for a digital component that represents a total number of candidate selection values from the top of the order to the given selection value. For example, the MPC cluster 130 calculates an accumulated value acc$_x$ that represents a total number of eligible candidate selection values in the final selection process that are ranked in front of selection value x using the following equation.

$$acc_x = \sum \text{is\_candidate}_b$$

where the variable b represents a candidate selection value b ranked in front of selection value x based on the selection values. In actual implementation, using secret shares, MPC1 calculates [acc$_{x,1}$] and MPC2 calculates [acc$_{x,2}$].

First, the MPC cluster 130 orders the selection values by ranking them according to a metric, such as their value. For example, if a selection value x has a value of 12 units and a selection value y has a selection value of 14 units, then the MPC cluster 130 can rank selection value y higher than selection value x. This process can be performed in cleartext. Once the selection values have been ordered, the MPC cluster 130 completes the final selection process by selecting a winner. The MPC cluster can calculate the winning result of the final selection process by determining the value of variable is_winner$_x$ for each cached selection value.

$$\text{is\_winner}_x = \text{is\_candidate}_x \times (acc_x == 0)$$

where the variable is_winner$_x$=1 if and only if x is the winner of the final selection process. Otherwise, the variable is_winner$_x$=0. Among all cached selection values and JIT selection values, there is at most one selection value x for which is_winner$_x$=1 for each final selection process performed in response to a digital component request.

The computing system MPC1 holds [is_winner$_{x,1}$]. The computing system MPC2 holds [is_winner$_{x,2}$]. Each of [is_winner$_{x,1}$] and [is_winner$_{x,2}$] represents a secret share of the variable is_winner$_x$.

To create the response, MPC1 calculates:

$$[\text{result}_1] = \sum_x ([\text{is\_winner}_{x,1}] \times \text{cached\_or\_jit\_sv}_x)$$

where cached_or_jit_sv$_x$ represents a cached selection value at the MPC cluster 130 or a JIT selection value received by the MPC cluster 130.

Similarly, MPC2 calculates:

$$[\text{result}_2] = \sum_x ([\text{is\_winner}_{x,2}] \times \text{cached\_or\_jit\_sv}_x)$$

Because there is at most one selection value x for which is_winner$_x$ has a non-zero value (i.e., a value of 1), result is either 0 (where no digital component is the winner, and therefore no digital component will be provided in response to the digital component request) or the selection value x that is one of the cached or JIT selection values for which is_winner$_x$ is 1.

Next, MPC2 encrypts its secret share of result using the application 112's public key according to the following equation: PubKeyEncrypt([result2], application_public_key), where application_public_key is the public key for the application 112, and [result$_2$] is the secret share of result held by MPC2. The encryption function PubKeyEncrypt prevents MPC1 from accessing [result$_2$] to prevent MPC1 from being able to reconstruct result from both secret shares once MPC1 receives [result$_2$] from MPC2 for final transmission to application 112.

In some implementations, MPC2 signs its secret share of result according to the following equation: PubKeySign (PubKeyEncrypt([result$_2$], application_public_key), MPC2), where the function PubKeySign allows MPC2 to sign its secret share of result such that application 112 can verify that [result$_2$] originated from MPC2. Signing the results can prevent MPC1 from falsifying the result of MPC2. In some implementations, MPC2 signs its secret share of result according to the following equation: PubKeyEncrypt(PubKeySign([result2], MPC2), application_public_key).

In step 14, one of the MPC computing systems, returns a response to the digital component request received in step 1 to client device 110. In this example MPC1 returns a full response to client device 110. The response that MPC1 returns includes: [result1] and PubKeySign(PubKeyEncrypt ([result2], application_public_key), MPC2).

In step 15, client device 110 renders the digital component mapped to the selection value indicated by result. First, client device 110 receives the response with two secret shares of the result originating from MPC1 and MPC2 respectively, which enables application 112 to reconstruct the result in cleartext and present the resultant digital component on client device 110.

If MPC2 signed its secret share of result, application 112 verifies MPC2's digital signature. Furthermore, application 112 decrypts MPC2 with its own private key that corresponds to the public key with which MPC2 has encrypted [result2] in order to recover [result2] in cleartext. Now that application 112 holds both secret shares of result in cleartext, application 112 reconstructs result from [result1] and [result2].

In step 16, client device 110 returns an impression notification to MPC cluster 130 that allows MPC cluster 130 update data structures used to track variables needed to enforce selection rules such as pacing control rules and k-anonymity rules. The impression notification can include the values of variables used to update counter variables maintained by the MPC cluster 130 for tracking k-anonymity and pacing control. These counter variables may be cached by the MPC cluster 130.

In step 17, the MPC cluster 130 updates its counter variables based on the impression notification. For example, MPC1 and MPC2 can update counters cached within the MPC cluster 130 to track pacing control and k-anonymity. In some implementations, to reduce the number of operations being performed (e.g., queries per second (QPS)) on the MPC cluster 130, the application 112 may hold the impression notification for a duration of time, and send it to the MPC cluster 130 asynchronously. For example, application 112 can "piggy-back" an impression notification with a future digital component request by transmitting the impression notification with the digital component request to the MPC cluster 130. By transmitting the impression notification along with data that must be transmitted to the MPC cluster 130, application 112 can reduce data traffic. In some implementations, if the application 112 is unable to find any piggy-back opportunities at the end of a predetermined duration of time, the application can send the impression notification to the MPC cluster 130 in a dedicated message to prevent delays in updating the counters and any inaccuracies that can result from delays in updating the counters. For example, application 112 can transmit the impression notification to the MPC cluster 130 in a dedicated HTTP request.

In some implementations, in order to prevent the MPC cluster 130 from becoming a single point of failure for system 100, the triggering elements embedded within the internet location where the digital component will be presented and/or displayed can also resend the digital component request transmitted to the application 112 to the SSP 170 (e.g., the unconditional request) directly in the case that application 112 fails to send the request to the MPC cluster 130 if the MPC cluster 130 has an outage. This back-up mechanism does not increase the complexity of the triggering element embedded within the internet location where the digital component will be presented and/or displayed, because the triggering element normally creates the unconditional request. Additionally, the back-up mechanism does not increase the complexity of the SSP 170 either. The SSP 170 will receive the same digital component request either from the MPC cluster 130 during normal operation, or from the triggering element directly if the MPC cluster 130 has an outage. Whether the triggering element receives the response from the MPC cluster 130 during normal operation or from the SSP 170 during an outage of the MPC cluster 130, the triggering element only needs to render the winning final result.

This system design allows for an improved user experience without significantly increasing bandwidth and battery consumption for mobile devices. The MPC cluster 130 blocks the SSP 170 and DSPs 150 from seeing the client device 110's identifying information, such as client device 110's IP address associated with the digital components. At no additional cost in terms of computing resources, the system prevents SSPs and DSPs from using a client device 110's IP address as a fingerprinting signal to passively collect user data. This can be a problem because many SSPs and DSPs passively listen to digital component requests to collect signals without user permission, and when user identifiers that can be used as fingerprinting signals (i.e., deterministic signals that can uniquely identify a user) are absent from digital component requests, those servers can use the data to identify users. The system blocks such passive data collection based on information such as client device 110's IP address.

For servers that provide elements on an internet location, such servers can implement signal collection logic to prevent unwanted or malicious content distribution as scripts in digital components to improve user experience. The collected signals can be transmitted back to the servers in an impression notification.

In some implementations, some entities have a legitimate use for fingerprinting signals, such as IP addresses. For example, functions using geographic information are widely used to tailor and deliver location-specific digital components to users to improve the relevance and utility of the information provided to the users. To enable legitimate use cases, the MPC cluster 130 can perform the functions to send location signals and/or identifying information with appropriate granularity to SSPs and DSPs or forward properly truncated or redacted information to SSPs and DSPs. Alternatively, for each application and content publisher domain pair, the MPC cluster 130 could assign an alternate IP address from the same geographical region to support geotargeting functions.

Furthermore, the MPC cluster 130 can also block illegitimate traffic, improving user experience and reducing unnecessary traffic. For example, after identifying malicious or illegitimate traffic from specific IP addresses or subnetworks, the SSP 170 can upload an IP address block list to the MPC cluster 130, which securely holds the information. The MPC cluster 130 can then filter out all digital component requests from IP Addresses on the block list.

Figure 4:
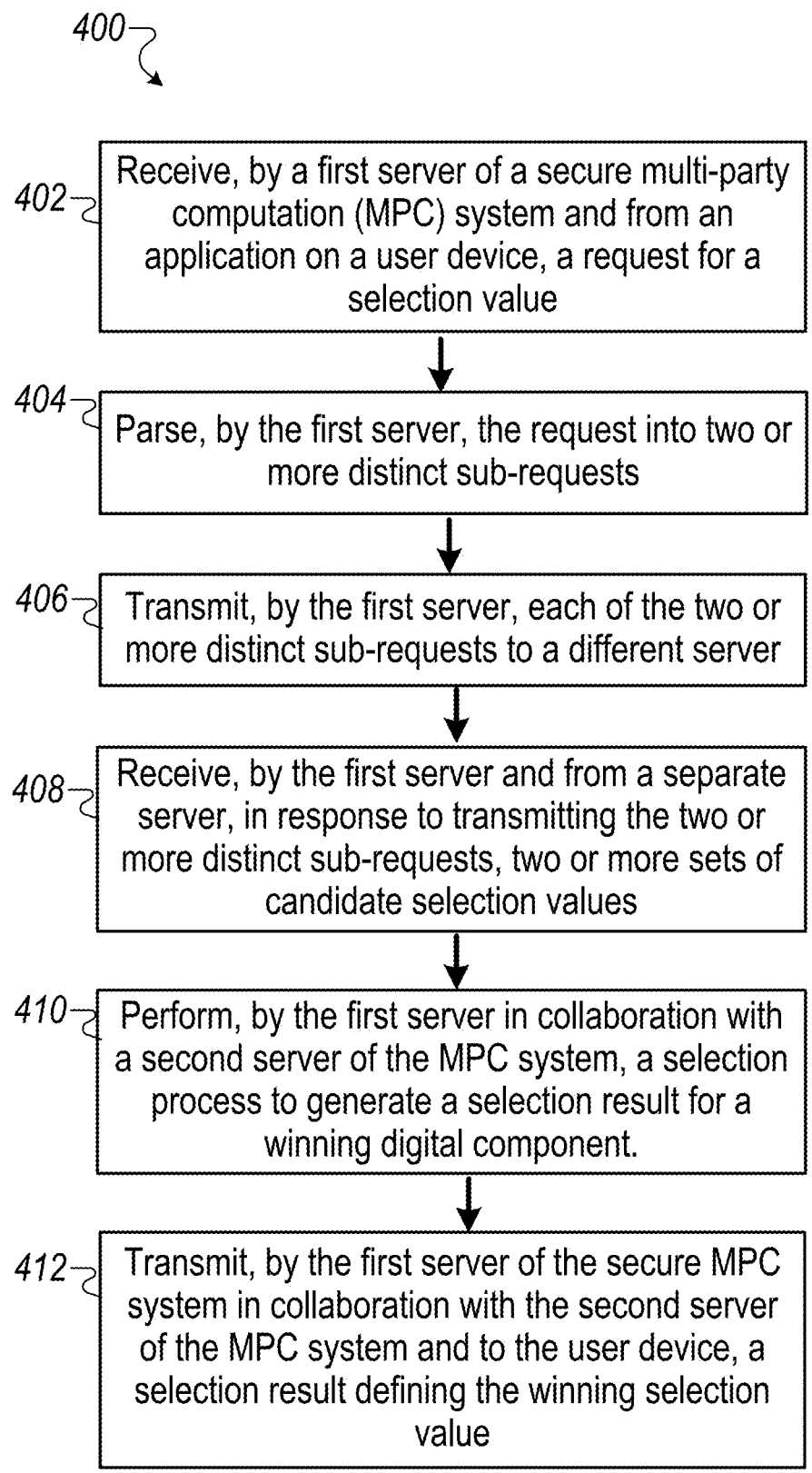
FIG. 4 is a flow diagram that illustrates an example process for selecting a digital component for distribution to a client device.

FIG. 4 is a flow diagram that illustrates an example process 400 for selecting a digital component for distribution to a client device. Operations of the process 400 can be implemented, for example, by the computing system MPC1 or the computing system MPC2 of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400. For brevity, the process 400 is described as being performed by the computing system MPC1 of the MPC cluster 130.

Process 400 begins with receiving, by a first server of a secure multi-party computation (MPC) system and from an application on a user device, a request for a digital component (402). For example, computing system MPC1 of the MPC cluster 130 can receive a request for one or more digital components from client device 110 for a particular digital component slot. The request can include information indicating characteristics of the digital component slot, the context (including the content in which the digital component slot is located) of the slot, content distribution and/or selection rules specified by client device 110, and user-provided information, among other information.

Process 400 continues with parsing, by the first server of the secure MPC system, the request into two or more distinct sub-requests (404). For example, MPC1 can parse the request into three sub-requests. In some implementations, the distinct parts can be separated based on destination and the type of information on which the request is conditioned (i.e., sensitive information or not sensitive information). For example, the sub-requests can include a secret share for each of the computing systems MPC1 and MPC2 of a digital component request based on sensitive information, and a digital component request based on non-sensitive information for the SSP 170.

Process 400 continues with transmitting, by the first server of the secure MPC system, each of the two or more distinct parts of the request to a different server (406). For example, MPC1 can transmit separate sub-requests to SSP 170, to MPC1 (itself), and to MPC2.

In some implementations, the two or more different servers include a supply-side platform server that automates the process of distributing digital components and communicates with one or more content publishers. For example, MPC1 can transmit distinct sub-requests of the request to SSP 170 and to MPC2. In some implementations, MPC1 can transmit distinct sub-requests of the request to SSP 170 and SSP 170 can forward distinct portions of the sub-request to DSP 150.

Process 400 continues with receiving, by the first server of the secure MPC system and from a separate server in response to transmitting the two or more distinct sub-requests of the request, a first set of candidate selection values (408). For example, MPC1 can receive a secret share of a set of candidate selection values from MPC2 and secret shares of a set of candidate selection values from SSP 170.

In some implementations, this includes receiving, from a separate server, at least two secret shares for each candidate selection value of a first set of candidate selection values. For example, MPC1 can receive, from SSP 170, two secret shares for each candidate selection value, wherein the first secret share is unencrypted, and wherein the second secret share is encrypted using a public key encryption algorithm and MPC2's public key.

Process 400 continues with performing, by the first server in collaboration with a second server of the MPC system, a selection process to generate a selection result for a winning digital component that includes merging, by the first server, the first set of candidate selection values and a set of cached selection values to create a final set of candidate selection values, sorting, by the first server, the final set of candidate selection values according to the values of the candidate selection values, and applying, by the first server, each rule of a set of two or more selection rules (410). For example, computing system MPC1 of the MPC cluster 130 can perform a final selection process as described with respect to FIGS. 2 and 3 in collaboration with MPC2. The MPC cluster 130 applies all selection rules to the cached selection values and the selection values received from SSP 170 to determine a set of eligible selection values. The MPC cluster 130 then orders the eligible selection values and select the winner of the selection process.

In some implementations, performing the selection process includes merging, by the first server of the secure MPC system, the two or more sets of candidate selection values and a set of cached selection values to create the final set of candidate selection values, and sorting, by the first server of the secure MPC system, the final set of candidate selection values according to the values of the candidate selection values. In some implementations, the merging and the sorting can be performed by the first server as a single comparison-based sorting process. For example, the MPC cluster 130 can perform a merge-sort operation on the cached selection values and the selection values received from SSP 170.

In some implementations, the set of selection rules includes at least a privacy-preserving anonymity enforcement rule. In some implementations, the set of selection rules includes a budgeting rule or a pacing rule. In some implementations, the set of selection rules includes at least one rule specifying a function in which each user group identifier of a set of one or more user group identifiers is compared to a user group identifier mapped to a candidate selection value. For example, the MPC cluster 130 can determine the eligibility of each candidate selection value in the final set of candidate selection values based on user group membership of the candidate selection value and indicated by the digital component request.

Process 400 continues with transmitting, by the first server of the secure MPC system in collaboration with the second server of the MPC system and to the user device, the winning selection value (412). For example, MPC1 of the MPC cluster 130 can provide a secret share of the winning selection value to client device 110.

In some implementations, transmitting the winning selection value from the final selection process includes receiving, by the first server of the secure MPC system and from the second server of the secure MPC system, a first secret share of the selection result; and transmitting, by the first server of the secure MPC system and to the client device, (i) the first secret share of the selection result and (ii) a second secret share of the selection result. For example, MPC2 of the MPC cluster 130 transmits its secret share of data indicating the digital component mapped to the winning selection value to MPC1 of the MPC cluster 130 and MPC1 transmits its own secret share of the data indicating the digital component mapped to the winning selection value along with the secret share from MPC2 to client device 110.

In some implementations, MPC2 encrypts its secret share of the selection result prior to sending the secret share to MPC1. In this way, MPC1 cannot combine the two secret shares to obtain the plaintext value of the selection result, which prevents MPC1 from identifying the winning selection value and its corresponding digital component, thereby preserving user privacy with respect to the digital component being presented to the user. Each MPC2 can encrypt its share of the selection result using a public key of the user device or application of the user device. The user device can then use its private key corresponding to the public key to decrypt the selection result.

Process 400 can include receiving, by the first server of the secure MPC system and from the application on the user device, a notification comprising data indicating that the digital component was presented at the client device. For example, MPC1 of the MPC cluster 130 can receive, from client device 110, an impression notification that indicates that the digital component was rendered at client device 110.

In some implementations, process 400 includes updating, by first server of the secure MPC system, a data structure for determining whether digital components satisfy a privacy-preserving anonymity enforcement rule that maintains a value for a privacy-preserving characteristic corresponding to the winning selection value. For example, the MPC cluster 130 can update counter variables satisfy_k_anonymity$_x$ for each selection value x. The variables satisfy_k_anonymity$_x$ represent whether selection value x satisfies the k-anonymity rule.

In some implementations, the notification comprising data indicating that the digital component corresponding to the winning selection value was presented at the client device is received by the first server of the secure MPC system with a second request for a second selection value. For example, the application 112 can provide the impression notification to the MPC cluster 130 asynchronously and along with a subsequent digital component request to conserve transmission and computation resources required.

Figure 5:
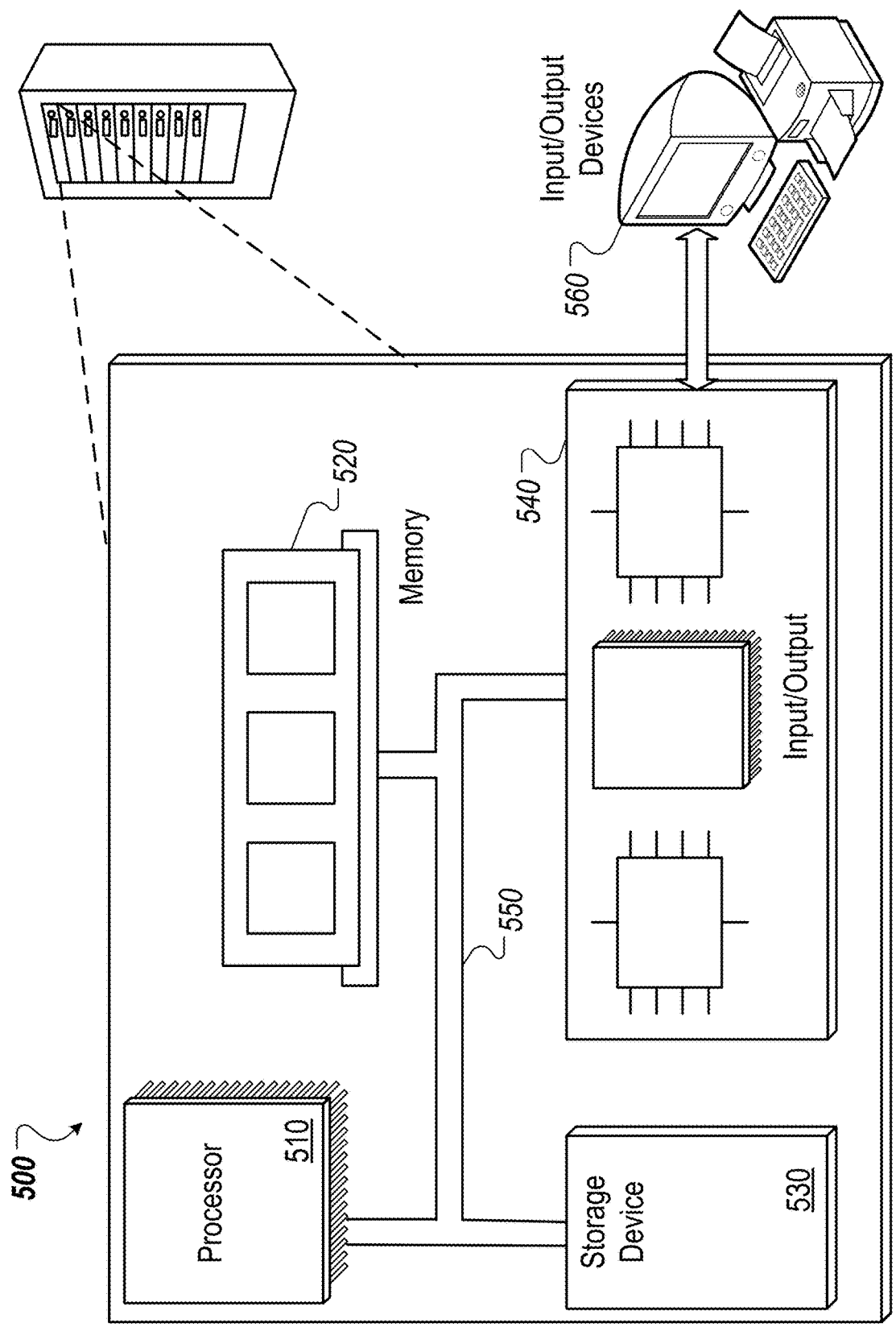
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The following is a non-exhaustive list of aspects of the present disclosure:

Aspect 1. A computer-implemented method comprising:
  receiving, by a first server of a secure multi-party computation (MPC) system and from an application on a user device, a request for a digital component;
  parsing, by the first server, the request into two or more distinct sub-requests;
  transmitting, by the first server of the secure MPC system, each of the two or more distinct sub-requests to a different server;
  receiving, by the first server and from a separate server in response to transmitting the two or more distinct sub-requests, a first set of candidate selection values;
  performing, by the first server in collaboration with one or more second servers of the MPC system, a selection process to generate a selection result for a winning digital component comprising:
    merging, by the first server, the first set of candidate selection values and a set of cached selection values to create a final set of candidate selection values;
    sorting, by the first server, the final set of candidate selection values according to the values of the candidate selection values; and
    applying, by the first server, each rule of a set of two or more selection rules; and
  transmitting, by the first server in collaboration with the one or more second servers and to the user device, the selection result for the winning digital component.

Aspect 1a. The method of aspect 1, wherein the different server is the second server of the MPC system.

Aspect 1b. The method of aspect 1, wherein the different server is a supply-side platform server.

Aspect 1c. The method of any one of aspects 1-1b, wherein the separate server is a supply-side platform server.

Aspect 2. The method of any one of aspects 1-1c, further comprising:
  receiving, by the first server of the secure MPC system and from the application on the user device, a notification comprising data indicating that the winning digital component was presented at the client device.

Aspect 3. The method of aspect 2, wherein the notification comprising data indicating that the digital component corresponding to the winning selection value was presented at the client device is received by the first server of the secure MPC system with a second request for a second selection value.

Aspect 4. The method of any one of aspects 1-3, wherein transmitting the selection result for the winning digital component from the final selection process comprises:
  receiving, by the first server of the secure MPC system and from each second server of the secure MPC system, a first secret share of the selection result; and
  transmitting, by the first server of the secure MPC system and to the client device, (i) each first secret share of the selection result and (ii) a second secret share of the selection result.

Aspect 5. The method of any one of aspects 1-4, wherein receiving the first set of candidate selection values comprises receiving, from the separate server, at least two secret shares for each candidate selection value of a first set of candidate selection values.

Aspect 6. The method of aspect 5, wherein the merging and the sorting are performed by the first server as a single comparison-based sorting process.

Aspect 7. The method of any one of aspects 1-6, wherein the set of selection rules comprises at least a privacy-preserving anonymity enforcement rule.

Aspect 8. A system comprising:
  one or more processors; and
  one or more memory elements including instructions that, when executed, cause the one or more processors to perform operations including:
    receiving, by a first server of a secure multi-party computation (MPC) system and from an application on a user device, a request for a digital component;
    parsing, by the first server, the request into two or more distinct sub-requests;
    transmitting, by the first server of the secure MPC system, each of the two or more distinct sub-requests to a different server;
    receiving, by the first server and from a separate server in response to transmitting the two or more distinct sub-requests, a first set of candidate selection values;
    performing, by the first server in collaboration with one or more second servers of the MPC system, a selection process to generate a selection result for a winning digital component comprising:
      merging, by the first server, the first set of candidate selection values and a set of cached selection values to create a final set of candidate selection values;
      sorting, by the first server, the final set of candidate selection values according to the values of the candidate selection values; and
      applying, by the first server, each rule of a set of two or more selection rules; and
    transmitting, by the first server in collaboration with the one or more second servers and to the user device, the selection result for the winning digital component.

Aspect 8a. The system of aspect 8, wherein the different server is the second server of the MPC system.

Aspect 8b. The system of aspect 8, wherein the different server is a supply-side platform server.

Aspect 8c. The system of any one of aspects 8-8b, wherein the separate server is a supply-side platform server.

Aspect 9. The system of any one of aspects 8-8c, the operations further comprising:
  receiving, by the first server of the secure MPC system and from the application on the user device, a notification comprising data indicating that the winning digital component was presented at the client device.

Aspect 10. The system of aspect 9, wherein the notification comprising data indicating that the digital component corresponding to the winning selection value was presented at the client device is received by the first server of the secure MPC system with a second request for a second selection value.

Aspect 11. The system of any one of aspects 8-10, wherein transmitting the selection result for the winning digital component from the final selection process comprises:
  receiving, by the first server of the secure MPC system and from each second server of the secure MPC system, a first secret share of the selection result; and
  transmitting, by the first server of the secure MPC system and to the client device, (i) each first secret share of the selection result and (ii) a second secret share of the selection result.

Aspect 12. The system of any one of aspects 8-11, wherein receiving the first set of candidate selection values comprises receiving, from the separate server, at least two secret shares for each candidate selection value of a first set of candidate selection values.

Aspect 13. The system of aspect 12, wherein the merging and the sorting are performed by the first server as a single comparison-based sorting process.

Aspect 14. The system of any one of aspects 8-13, wherein the set of selection rules comprises at least a privacy-preserving anonymity enforcement rule.

Aspect 15. A non-transitory computer storage medium encoded with instructions that when executed by a distributed computing system cause the distributed computing system to perform operations comprising:
  receiving, by a first server of a secure multi-party computation (MPC) system and from an application on a user device, a request for a digital component;
  parsing, by the first server, the request into two or more distinct sub-requests;
  transmitting, by the first server of the secure MPC system, each of the two or more distinct sub-requests to a different server;
  receiving, by the first server and from a separate server in response to transmitting the two or more distinct sub-requests, a first set of candidate selection values;
  performing, by the first server in collaboration with one or more second servers of the MPC system, a selection process to generate a selection result for a winning digital component comprising:
  merging, by the first server, the first set of candidate selection values and a set of cached selection values to create a final set of candidate selection values;
  sorting, by the first server, the final set of candidate selection values according to the values of the candidate selection values; and
  applying, by the first server, each rule of a set of two or more selection rules; and
  transmitting, by the first server in collaboration with the one or more second servers and to the user device, the selection result for the winning digital component.

Aspect 15a. The non-transitory computer storage medium of aspect 15, wherein the different server is the second server of the MPC system.

Aspect 15b. The non-transitory computer storage medium of aspect 15, wherein the different server is a supply-side platform server.

Aspect 15c. The non-transitory computer storage medium of any one of aspects 15-15b, wherein the separate server is a supply-side platform server.

Aspect 16. The non-transitory computer storage medium of any one of aspects 15-15c, the operations further comprising:
  receiving, by the first server of the secure MPC system and from the application on the user device, a notification comprising data indicating that the winning digital component was presented at the client device.

Aspect 17. The non-transitory computer storage medium of aspect 16, wherein the notification comprising data indicating that the digital component corresponding to the winning selection value was presented at the client device is received by the first server of the secure MPC system with a second request for a second selection value.

Aspect 18. The non-transitory computer storage medium of any one of aspects 15-17, wherein transmitting the selection result for the winning digital component from the final selection process comprises:
  receiving, by the first server of the secure MPC system and from each second server of the secure MPC system, a first secret share of the selection result; and
  transmitting, by the first server of the secure MPC system and to the client device, (i) each first secret share of the selection result and (ii) a second secret share of the selection result.

Aspect 19. The non-transitory computer storage medium of any one of aspects 15-18, wherein receiving the first set of candidate selection values comprises receiving, from the separate server, at least two secret shares for each candidate selection value of a first set of candidate selection values.

Aspect 20. The non-transitory computer storage medium of any one of aspects 15-19, wherein the merging and the sorting are performed by the first server as a single comparison-based sorting process.

Aspect 21. A system comprising: one or more processors; and
  one or more memory elements including instructions that, when executed, cause the one or more processors to perform operations including the method according to any one of aspects 1 to 7.

Aspect 22. A non-transitory computer storage medium encoded with instructions that when executed by a distributed computing system cause the distributed computing system to perform operations comprising the method according to any one of aspects 1 to 7.

The invention claimed is:

1. A computer-implemented method comprising:
  receiving, by a first server of a secure multi-party computation (MPC) system and from an application of a user device, a digital component request comprising contextual data and at least a first secret share of user data for a user of the user device;
  sending, by the first server and to a content platform, a contextual request comprising the contextual data;
  receiving, by the first server and from the content platform, a first set of selection values for a first set of digital components;
  performing, by the first server in collaboration with one or more second servers of the secure MPC system, an MPC selection process that is configured to:
    select, from among the first set of digital components and a second set of digital components for which selection values are stored by the secure MPC system, a particular digital component; and
    generate, for each server of the MPC system, a respective secret share of a selection result, the selection result comprising data identifying the particular digital component; and sending, by the first server, at least one of the respective secret shares of the selection result to the application.

2. The method of claim 1, wherein selecting, from among the first set of digital components and the second set of digital components a particular digital component comprises:
   selecting the second set of digital components from a plurality of digital components for which selection values are stored by the secure MPC system based on one or more conditions for each digital component in the plurality of digital components.

3. The method of claim 2, wherein selecting the second set of digital components based on the one or more conditions for each digital component in the plurality of digital components comprises selecting one or more digital components based on (i) a user group check condition for at least one digital component, (ii) the first secret share of the user data, and (iii) a respective second secret share of the user data received by each second server of the secure MPC system.

4. The method of claim 3, wherein selecting the one or more digital components comprises determining, for each digital component of the one or more digital components and as part of the MPC process, secret shares of a candidate parameter that indicates that the at least one digital component is eligible based on the user data indicating that the user is a member of a user group associated with the digital component.

5. The method of claim 4, wherein each server of the secure MPC system determines a respective secret share of the candidate parameter for each of the one or more digital components.

6. The method of claim 2, wherein the one or more conditions for at least one digital component is a pacing condition for pacing distribution of the at least one digital component to user devices.

7. The method of claim 2, wherein the one or more conditions for each digital component in the plurality of digital components comprises a privacy-preserving anonymity enforcement condition that ensures that each digital component is presented to at least a threshold number of users.

8. The method of claim 2, wherein:
   the one or more conditions for each digital component comprises a mute condition and the user data comprises data identifying digital components that are blocked by the user; and
   selecting the one or more digital components comprises determining, for each digital component of the one or more digital components and as part of the MPC process, secret shares of a candidate parameter that indicates that at least one digital component is eligible based on the user data indicating that the digital component is not blocked by the user.

9. The method of claim 1, wherein the user data is encoded in a probabilistic data structure and the first secret share of the user data comprises a first secret share of the probabilistic data structure.

10. A system comprising:
   one or more processors; and
   one or more storage devices storing instructions that, when executed by the one or more processors, cause the one or more processors to perform operations comprising:
      receiving, by a first server of a secure multi-party computation (MPC) system and from an application of a user device, a digital component request comprising contextual data and at least a first secret share of user data for a user of the user device;
      sending, by the first server and to a content platform, a contextual request comprising the contextual data;
      receiving, by the first server and from the content platform, a first set of selection values for a first set of digital components;
      performing, by the first server in collaboration with one or more second servers of the secure MPC system, an MPC selection process that is configured to:
         select, from among the first set of digital components and a second set of digital components for which selection values are stored by the secure MPC system, a particular digital component; and
         generate, for each server of the MPC system, a respective secret share of a selection result, the selection result comprising data identifying the particular digital component; and
      sending, by the first server, at least one of the respective secret shares of the selection result to the application.

11. The system of claim 10, wherein selecting, from among the first set of digital components and the second set of digital components a particular digital component comprises:
   selecting the second set of digital components from a plurality of digital components for which selection values are stored by the secure MPC system based on one or more conditions for each digital component in the plurality of digital components.

12. The system of claim 11, wherein selecting the second set of digital components based on the one or more conditions for each digital component in the plurality of digital components comprises selecting one or more digital components based on (i) a user group check condition for at least one digital component, (ii) the first secret share of the user data, and (iii) a respective second secret share of the user data received by each second server of the secure MPC system.

13. The system of claim 12, wherein selecting the one or more digital components comprises determining, for each digital component of the one or more digital components and as part of the MPC process, secret shares of a candidate parameter that indicates that the at least one digital component is eligible based on the user data indicating that the user is a member of a user group associated with the digital component.

14. The system of claim 13, wherein each server of the secure MPC system determines a respective secret share of the candidate parameter for each of the one or more digital components.

15. The system of claim 11, wherein the one or more conditions for at least one digital component is a pacing condition for pacing distribution of the at least one digital component to user devices.

16. The system of claim 11, wherein the one or more conditions for each digital component in the plurality of digital components comprises a privacy-preserving anonymity enforcement condition that ensures that each digital component is presented to at least a threshold number of users.

17. The system of claim 11, wherein:
   the one or more conditions for each digital component comprises a mute condition and the user data comprises data identifying digital components that are blocked by the user; and
   selecting the one or more digital components comprises determining, for each digital component of the one or more digital components and as part of the MPC process, secret shares of a candidate parameter that indicates that at least one digital component is eligible based on the user data indicating that the digital component is not blocked by the user.

18. The system of claim 10, wherein the user data is encoded in a probabilistic data structure and the first secret share of the user data comprises a first secret share of the probabilistic data structure.

19. A non-transitory computer readable storage medium carrying instructions that, when executed by one or more processors, cause the one or more processors to perform operations comprising:
- receiving, by a first server of a secure multi-party computation (MPC) system and from an application of a user device, a digital component request comprising contextual data and at least a first secret share of user data for a user of the user device;
- sending, by the first server and to a content platform, a contextual request comprising the contextual data;
- receiving, by the first server and from the content platform, a first set of selection values for a first set of digital components;
- performing, by the first server in collaboration with one or more second servers of the secure MPC system, an MPC selection process that is configured to:
  - select, from among the first set of digital components and a second set of digital components for which selection values are stored by the secure MPC system, a particular digital component; and
  - generate, for each server of the MPC system, a respective secret share of a selection result, the selection result comprising data identifying the particular digital component; and
- sending, by the first server, at least one of the respective secret shares of the selection result to the application.

20. The non-transitory computer readable storage medium of claim 19, wherein selecting, from among the first set of digital components and the second set of digital components a particular digital component comprises:
- selecting the second set of digital components from a plurality of digital components for which selection values are stored by the secure MPC system based on one or more conditions for each digital component in the plurality of digital components.

* * * * *